United States Patent
Okada (10) Patent No.: US 9,458,050 B2
(45) Date of Patent: Oct. 4, 2016

(54) OPTICAL FIBER MANUFACTURING APPARATUS AND METHOD

(71) Applicant: Fujikura Ltd., Tokyo (JP)

(72) Inventor: Kenji Okada, Sakura (JP)

(73) Assignee: FUJIKURA, LTD., Tokyo (JP)

( * ) Notice: Subject to any disclaimer, the term of this patent is extended or adjusted under 35 U.S.C. 154(b) by 0 days.

(21) Appl. No.: 14/802,083

(22) Filed: Jul. 17, 2015

(65) Prior Publication Data

US 2015/0321945 A1    Nov. 12, 2015

Related U.S. Application Data (63) Continuation of application No. PCT/JP2014/065881, filed on Jun. 16, 2014.

(30) Foreign Application Priority Data

Jun. 24, 2013   (JP) ................................. 2013-131904

(51) Int. Cl.
    *C03B 37/029*      (2006.01)
    *C03B 37/07*       (2006.01)
    *C03B 37/027*      (2006.01)
                 (Continued)

(52) U.S. Cl.
    CPC ........ *C03B 37/02736* (2013.01); *C03B 37/029* (2013.01); *C03C 25/1055* (2013.01); *C03C 25/12* (2013.01); *C03B 2205/80* (2013.01); *Y02P 40/57* (2015.11)

(58) Field of Classification Search
    CPC .......... C03B 37/02736; C03B 37/029; C03B 2205/80; C03B 25/1055; C03B 25/12; C03B 37/0253; C03B 2205/81
    See application file for complete search history.

(56) References Cited

U.S. PATENT DOCUMENTS

| | | | |
|---|---|---|---|
| 2003/0205068 A1* | 11/2003 | Taru ...................... | C03B 37/029 65/537 |
| 2005/0115278 A1* | 6/2005 | Mattila ................. | C03B 37/029 65/553 |
| 2006/0280578 A1* | 12/2006 | Shiono ................. | C03B 37/029 411/542 |

(Continued)

FOREIGN PATENT DOCUMENTS

| | | |
|---|---|---|
| EP | 1 069 086 A1 | 1/2001 |
| JP | 60-137842 A | 7/1985 |

(Continued)

OTHER PUBLICATIONS

Communication dated Jul. 19, 2016 from the Japanese Patent Office in counterpart application No. 2013-131904.

*Primary Examiner* — Jodi C Franklin
(74) *Attorney, Agent, or Firm* — Sughrue Mion, PLLC (57) ABSTRACT

An optical fiber manufacturing apparatus includes: a cylindrical shield pipe that is provided above a drawing furnace, and forms a space continuous with the heating space in a vertical direction; a sending rod that has a lower end attached to an optical fiber preform and a lower portion disposed inside the shield pipe, and is configured to insert the optical fiber preform into a heating space of the drawing furnace in the vertical direction; an alignment mechanism that is configured to move the sending rod in a horizontal direction; an inner sealing body that is attached to the lower portion of the sending rod; and an outer sealing body that is mounted on the inner sealing body, is configured to move in the horizontal direction with respect to the inner sealing body, and is spaced apart from the sending rod.

9 Claims, 6 Drawing Sheets

(51) Int. Cl.
*C03C 25/10* (2006.01)
*C03C 25/12* (2006.01)

(56) References Cited

U.S. PATENT DOCUMENTS

| | | | | |
|---|---|---|---|---|
| 2007/0283722 A1* | 12/2007 | Pathak | ............... | C03B 37/029 65/500 |
| 2010/0207333 A1* | 8/2010 | Otosaka | ............... | C03B 37/029 277/634 |
| 2011/0265522 A1* | 11/2011 | Okada | ............... | C03B 37/029 65/424 |
| 2013/0291601 A1* | 11/2013 | Otosaka | ............... | C03B 37/0124 65/377 |
| 2013/0298501 A1* | 11/2013 | Nummela | ............... | C03B 37/029 53/285 |
| 2015/0321944 A1* | 11/2015 | Yamazaki | ............... | G02B 6/00 277/312 |

FOREIGN PATENT DOCUMENTS

| | | |
|---|---|---|
| JP | 03-037128 A | 2/1991 |
| JP | 04-130030 A | 5/1992 |
| JP | 11-343137 A | 12/1999 |
| WO | WO2012/033158 * 3/2012 | ............ C03B 37/029 |

* cited by examiner

OPTICAL FIBER MANUFACTURING APPARATUS AND METHOD

CROSS REFERENCE TO RELATED APPLICATIONS

This application is a continuation application based on a PCT Patent Application No. PCT/JP2014/065881, filed Jun. 16, 2014, whose priority is claimed on Japanese Patent Application No. 2013-131904 filed on Jun. 24, 2013, the entire content of which are hereby incorporated by reference.

BACKGROUND OF THE INVENTION

1. Field of the Invention

The present invention relates to an optical fiber manufacturing apparatus and method, and in particular, an optical fiber manufacturing apparatus and method suitable for stable drawing of a large optical fiber preform when manufacturing a bare optical fiber by drawing of an optical fiber preform.

2. Description of the Related Art

Figure 5:
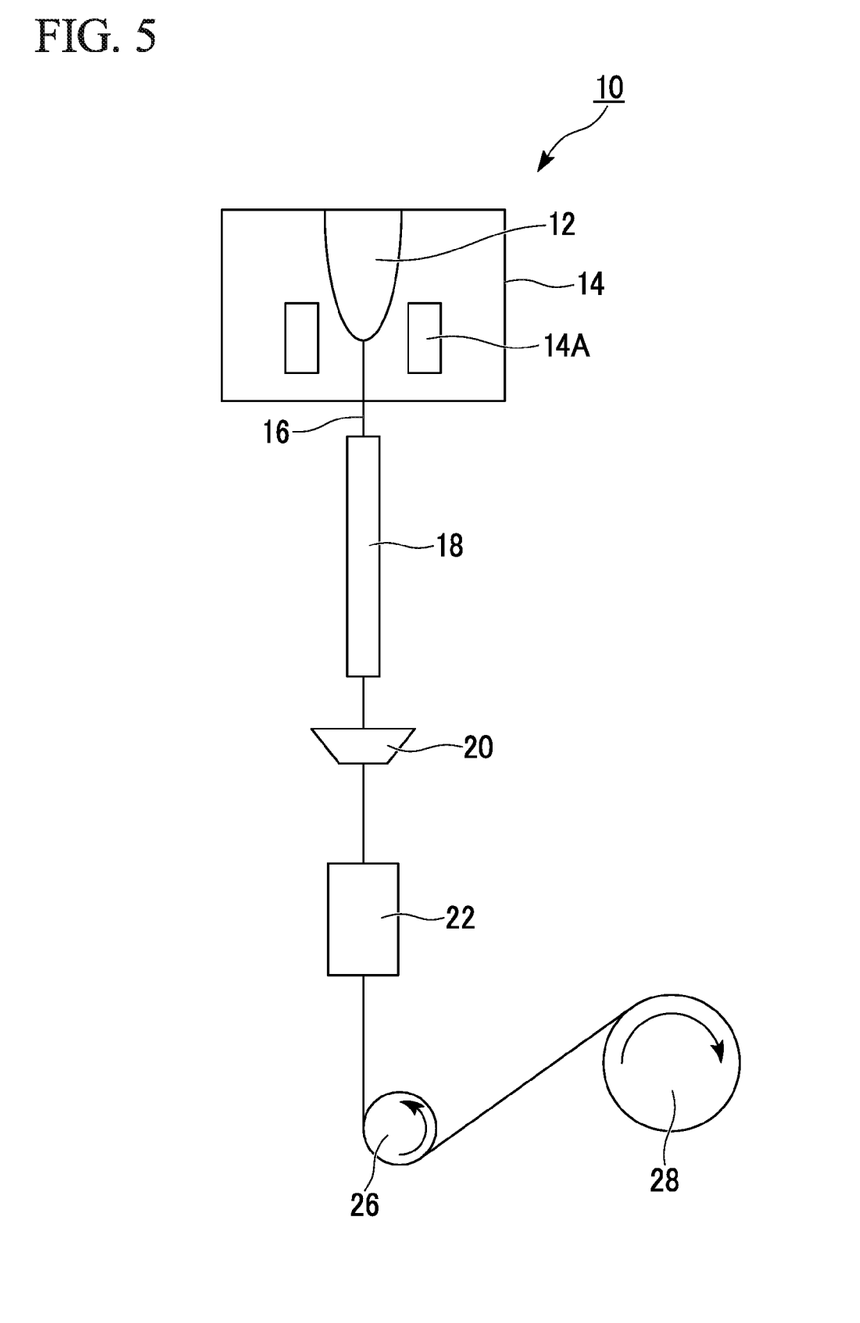
FIG. 5 is a schematic diagram showing the overall configuration of the optical fiber manufacturing apparatus.

In general, as an apparatus for manufacturing a silica glass based optical fiber, an apparatus shown in FIG. 5 is widely used. An optical fiber manufacturing apparatus 10 is configured to include a drawing furnace 14, a cooling device 18, a resin coating device (coating device) 20, a curing device 22, a take-up capstan 26, and a winding device 28. The drawing furnace 14 includes a heater 14A for heating and melting an optical fiber preform 12. The cooling device 18 forcibly cools a bare optical fiber 16 that is linearly pulled out downward from the drawing furnace 14. The resin coating device (coating device) 20 coats the cooled bare optical fiber 16 with a resin for protective coating. The curing device 22 cures the resin coated by the resin coating device 20, and is configured to include an ultraviolet (UV) irradiation device, a thermal cross-linking device, or the like. The take-up capstan 26 takes up an optical fiber 24 in a state in which the resin for protective coating has been cured.

When manufacturing the optical fiber using such an optical fiber manufacturing apparatus, first, the optical fiber preform (silica based glass preform) 12 that is a source material of the bare optical fiber is melted by being heated to the temperature of 2000° C. or higher in the drawing furnace 14. Then, the optical fiber preform 12 is pulled out (drawn) downward in a thin line shape from the bottom of the drawing furnace 14 while extending as the bare optical fiber 16 in the high-temperature state. Then, the bare optical fiber 16 is cooled by the cooling device 18 to a temperature at which the bare optical fiber 16 can be coated with resin. Then, the bare optical fiber 16 that has been cooled to the required temperature is coated (applied) with the resin for protection in an uncured state by the resin coating device 20. Then, the coated resin is cured by UV curing or heat curing in the curing device 22, and the optical fiber 24 having a protective coating layer is manufactured. Then, the optical fiber 24 is wound by the winding device 28 through the take-up capstan 26.

Incidentally, in the manufacturing of this type of optical fiber, the size of the optical fiber preform and the drawing speed have increased in order to improve the productivity. In addition, various problems have occurred with an increase in the drawing speed. For example, a problem of sealing (airtightness) between the optical fiber preform and the heating furnace, a problem of alignment of the bare optical fiber 16 pulled out from the heating furnace 14 with respect to the die hole of the resin coating device 20, and the like are likely to occur, and the solutions have been demanded.

That is, in the drawing furnace, in order to prevent the oxidation of carbon components or the like in the heating furnace, inert gas, such as argon gas, is supplied to the heating furnace. In this case, stability in the sealing (airtightness) of the space around the optical fiber preform in the heating furnace, especially, sealing between the outer peripheral surface of the optical fiber preform and the upper opening of the heating furnace, has been demanded. That is, if a gap between the outer surface of the optical fiber preform and the upper opening end of the heating furnace is not uniform, the flow of gas in the heating furnace is uneven. Accordingly, the outer diameter variation of the bare optical fiber is increased or the optical fiber preform heating temperature is not uniform. As a result, there is a possibility that the cross-sectional shape of the bare optical fiber pulled out from the heating furnace will deviate largely from the true circle (will become non-circular). In addition, with an increase in the size of the optical fiber preform, the outer diameter variation of the optical fiber preform has also increased, and bending (deflection) is also likely to occur in the optical fiber preform. For this reason, it is difficult to stabilize the sealing performance (airtightness) by maintaining uniformity of the gap between the outer surface of the optical fiber preform and the upper opening end of the heating furnace.

In addition, in the manufacturing of the optical fiber, it is necessary to precisely match the position of the bare optical fiber pulled out vertically downward from the heating furnace with the die center position in the resin coating device. That is, if the bare optical fiber pulled out from the heating furnace does not pass through the die center in the resin coating device, coating of the resin with respect to the bare optical fiber is not uniform, and there is a problem that a thickness of the coating layer is likely to become uneven. Therefore, it is necessary to match the position of the bare optical fiber with the die center position in the resin coating device, and this is generally referred to as alignment. However, since the bending (deflection) of the optical fiber preform also increases with an increase in the size of the optical fiber preform, the alignment also becomes difficult.

In addition, stabilization of the sealing performance of the heating furnace and appropriate control of the alignment become still more difficult with an increase in the drawing speed.

Figure 6:
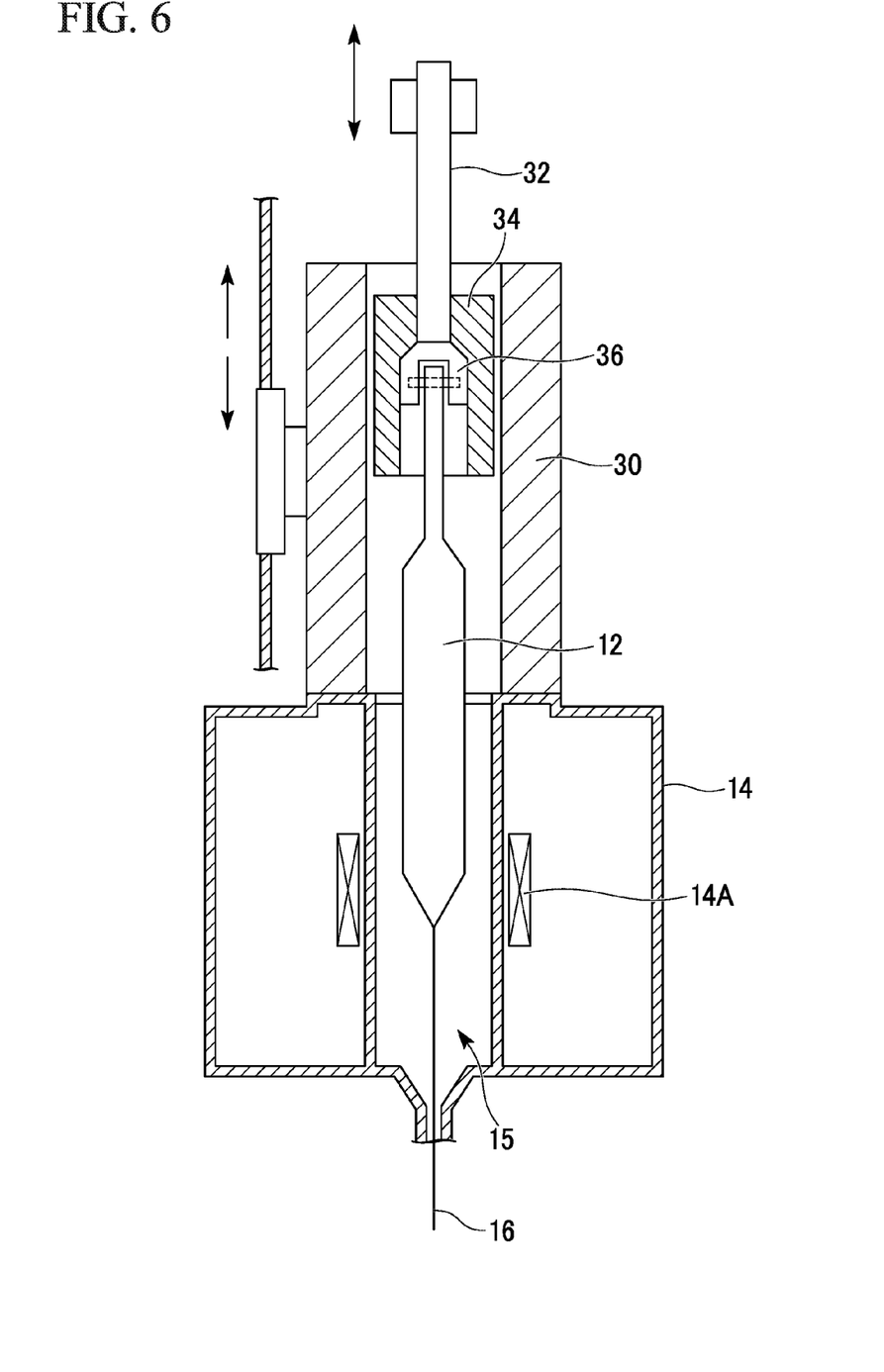
FIG. 6 is a schematic diagram showing a known optical fiber manufacturing apparatus shown in PTL 1.

Incidentally, in Japanese Unexamined Patent Application, First Publication No. H3-37128 (hereinafter referred to as "PTL 1"), as shown in FIG. 6, a cylindrical shield pipe 30 connected to a heating space 15 in a heating furnace is provided above the heating furnace 14. The shield pipe 30 stabilizes the sealing (airtightness of the drawing furnace 14) between the inner space (heating space) 15 of the drawing furnace 14 and the optical fiber preform 12. In addition, PTL 1 discloses an optical fiber drawing furnace (drawing furnace) including a sending rod 32, a sealing member 34, and a connecting member 36. The sending rod 32 is provided in the shield pipe 30, and lowers according to the amount of drawing of the optical fiber preform 12. The sealing member 34 is provided around the lower end of the sending rod 32, and fits in the shield pipe 30 so as to be vertically movable. The connecting member 36 is provided at the lower end of the sending rod 32, and connects the lower end to the upper end of the optical fiber preform 12.

In PTL 1, the sealing performance of the heating furnace 14 is ensured between the shield pipe 30 and the sealing member 34 in the shield pipe. Therefore, PTL 1 discloses that good drawing is possible since it is possible to maintain the stable sealing performance without dependence on the diameter of the optical fiber preform.

Japanese Unexamined Patent Application, First Publication No. S60-137842 (hereinafter referred to as "PTL 2") discloses that an adjusting device (alignment control device) configured to adjust the position of the optical fiber preform in X and Y directions within the horizontal plane is provided on the upper side of the heating furnace. Specifically, PTL 2 discloses that the position of the preform is controlled by detecting the position of the bare fiber, which is pulled out vertically downward from the heating furnace, immediately below the heating furnace and inputting the detected signal to the alignment control device. In addition, if there is misalignment of a gripping in a chuck for gripping the optical fiber preform, bending of the preform itself, or the like, the clearance between the preform and an airtight plate (upper airtight plate) provided at the upper opening end of the drawing furnace may become asymmetrical or the preform and the airtight plate may be in contact with each other. Therefore, PTL 2 discloses that the position of the upper airtight plate is also controlled to keep the above mentioned clearance constant.

In addition, Japanese Unexamined Patent Application, First Publication No. H4-130030 (hereinafter referred to as "PTL 3") discloses that the position of the bare optical fiber immediately below the drawing furnace is detected and the position of the optical fiber preform is adjusted based on the detection signal similar to PTL 2. Here, as a preform position adjusting method, not only moving a holder portion configured to grip the preform but also fixing the drawing furnace and the preform holder to a single movable table, making the table slidable within the horizontal plane, detecting the position of the bare optical fiber using a fiber position detecting device immediately below the movable table, and making the movable table slide based on the position detection signal is disclosed. In addition, PTL 3 discloses that an alignment device is interposed between the movable table and the support base in such a manner described above so that other mechanisms are neither enlarged nor complicated.

The overview of the related arts disclosed in the above PTLs is as follows.

PTL 1: In order to stabilize the sealing performance of the drawing furnace, a shield pipe is connected to the upper portion of the heating furnace configured to seal between the inner surface of the shield pipe and the outer surface of the sealing member around the sending rod.

PTL 2: Both a holder portion configured to support the optical fiber preform and the upper airtight plate of the drawing furnace are aligned.

PTL 3: In order to align the bare optical fiber position, the drawing furnace and the preform holder are placed on the same table, and alignment is performed for each table.

The above techniques disclosed in PTLs 1 to 3 have the following problems.

That is, in the case of PTL 1, there is no alignment mechanism. Therefore, it is not possible to respond to deflection or bending when the optical fiber preform is large.

In the case of PTL 2, since there is no shield pipe, it is difficult to ensure the sealing performance when using a preform with an outer diameter variation in the longitudinal direction of the optical fiber preform. In addition, it is necessary to use an airtight plate that matches the outer diameter of each preform, but replacement of the airtight plate is complicated when optical fiber preforms of various diameters are targets.

In addition, in the case of PTL 3, misalignment between the drawing furnace and the optical fiber preform is not resolved. For this reason, when the preform is bent or when the preform setting position deviates from the center of the drawing furnace, the distribution of the heat applied to the preform becomes non-uniform in the circumferential direction. Thus, since the roundness of the cross section of the bare optical fiber becomes worse or the flow of gas within the drawing furnace becomes uneven, the outer diameter variation of the bare optical fiber is increased.

Therefore, in the related arts proposed, it has been difficult to always effectively ensure stable sealing performance for the bending or deflection of the optical fiber preform, the outer diameter variation of the optical fiber preform in the longitudinal direction, or the outer diameter variation for each lot.

In addition, although the techniques of PTLs 1 to 3 may be combined in some cases, there are the following problems even if these are combined.

For example, when the technique of PTL 1 and the technique of PTL 2 are combined, it is necessary to align the shield pipe itself. In this case, not only does a problem in the movable structure and the method for sealing between the upper portion of the drawing furnace and the connecting portion (contact portion) of the shield pipe occurs, but also the alignment device becomes large and complicated.

In addition, when the technique of PTL 1 and the technique of PTL 3 are combined, it is possible to move the drawing furnace, the sending rod, and the shield pipe in a state where all of the drawing furnace, the sending rod, and the shield pipe are placed on the same movable table, but the problem of misalignment between the drawing furnace and the optical fiber preform still remains unresolved as described above.

The present invention has been made in view of the above situation, and it is an object of the present invention to provide an optical fiber manufacturing apparatus that includes a sealing member, which can effectively ensure the always stable sealing performance for the bending or deflection of the optical fiber preform, the outer diameter variation of the optical fiber preform in the longitudinal direction, or the outer diameter variation for each lot, and that is not enlarged and complicated, and an optical fiber manufacturing method using the optical fiber manufacturing apparatus.

SUMMARY

Through various experiments and studies on means for solving the aforementioned problems, it has been found that the aforementioned problems can be solved by adding an alignment mechanism to the apparatus disclosed in PTL 1 and using a sealing member divided into two parts instead of the shield member (having a single structure) in the apparatus shown in PTL 1, and as a result, the present invention has been accomplished.

An optical fiber manufacturing apparatus according to a first aspect of the present invention includes: a drawing furnace that forms a heating space and is configured to heat and melt a silica based optical fiber preform in the heating space; a cylindrical shield pipe that is provided above the drawing furnace, forms a space continuous with the heating space in a vertical direction, and has an inner peripheral surface; a sending rod that has a lower end attached to the optical fiber preform and a lower portion disposed inside the shield pipe, and is configured to insert the optical fiber preform into the heating space in the vertical direction; an alignment mechanism that is configured to move the sending rod in a horizontal direction; an inner sealing body that is attached to the lower portion of the sending rod and moves in the horizontal direction with movement of the sending rod in the horizontal direction; and an outer sealing body that has an outer peripheral surface, is mounted on the inner sealing body, is configured to move in the horizontal direction with respect to the inner sealing body, is spaced apart from the sending rod, and is configured to move in the vertical direction with respect to the inner peripheral surfaces of the shield pipe. Between the outer peripheral surface of the outer sealing body and the inner peripheral surface of the shield pipe and between the inner sealing body and the outer sealing body, the outer sealing body, the shield pipe, and the inner sealing body are disposed such that a space below the inner sealing body is sealed against an outer space above the shield pipe. A bare optical fiber is formed by heating the optical fiber preform while introducing gas into the heating space and pulling out the softened optical fiber preform linearly downward from the drawing furnace, the bare optical fiber is cooled and solidified, and then a resin coating layer is formed on an outer periphery of the bare optical fiber to complete an optical fiber.

In the optical fiber manufacturing apparatus according to the above aspect, the sealing member is divided into two parts (inner sealing body and outer sealing body). The space inside the drawing furnace and the space inside the lower portion of the shield pipe (space below the inner sealing body) are sealed against the outer space above the shield pipe by the gap (G1) between the outer sealing body and the inner sealing body and the gap (G2) between the outer sealing body and the shield pipe. In addition, by forming the outer sealing body so as to be movable relatively in the horizontal direction with respect to the inner sealing body, which moves with the movement of the sending rod in the horizontal direction by alignment, and to be spaced apart from the sending rod, the aforementioned problem of the technique of PTL 1 is solved. That is, even if the sending rod moves in the horizontal direction for the alignment, the outer sealing body is not moved substantially. Accordingly, since the large movement of the sending rod in the horizontal direction is allowed, the occurrence of bending of the sending rod is avoided. In addition, even if there is bending or deflection of the optical fiber preform or an outer diameter variation, it is possible to stabilize the sealing performance by maintaining the gaps G1 and G2 stably while performing alignment according to the bending or deflection or the outer diameter variation.

In the first embodiment described above, sealing the space inside the drawing furnace and the space inside the lower portion of the shield pipe against the outer space above the shield pipe does not mean sealing the space completely so that no gas leaks to the outside but means sealing the space so that gas does not leak at an excessive flow rate while allowing the leakage at a small flow rate. Specifically, for example, as described in the aspect regarding the manufacturing method to be described below, assuming that the gas pressure in the heating furnace at the upper end of the drawing furnace is an indicator, sealing the space inside the drawing furnace and the space inside the lower portion of the shield pipe against the outer space above the shield pipe means limiting the leakage of gas from the inside of the drawing furnace and the gas flow introduced into the drawing furnace so that the gas pressure falls within the range of 5 Pa to 500 Pa.

A gap between the inner sealing body and the outer sealing body may be adjustable.

The gap between the inner sealing body and the outer sealing body may be adjustable in a range of 0.01 mm to 1.0 mm.

A ball transfer which is configured to hold the outer sealing body so as to be movable in the horizontal direction with respect to the inner sealing body may be interposed between the inner sealing body and the outer sealing body.

A gap between the inner sealing body and the outer sealing body may be 0.01 mm to 1.0 mm.

A gap between the outer peripheral surface of the outer sealing body and the inner peripheral surface of the shield pipe may be 0.01 mm to 1.0 mm.

The optical fiber manufacturing apparatus according to the first aspect may further include a position detector that is disposed immediately below the drawing furnace and that detects a position of the bare optical fiber, which is pulled out downward from the drawing furnace, in the horizontal direction. The alignment mechanism may adjust a position of the sending rod in the horizontal direction according to the position of the bare optical fiber detected by the position detector.

An optical fiber manufacturing method according to a second aspect of the present invention includes heating an optical fiber preform while adjusting gas pressure in a heating furnace at an upper end of the drawing furnace in a range of 5 Pa to 500 Pa when manufacturing an optical fiber using the optical fiber manufacturing apparatus according to the above first aspect.

An optical fiber manufacturing method according to a third aspect of the present invention includes setting the alignment mechanism such that an alignment possible range of the sending rod in the horizontal direction is larger than a maximum range of deflection of the sending rod in the horizontal direction when manufacturing an optical fiber using the optical fiber manufacturing apparatus according to the above first aspect.

According to the optical fiber manufacturing apparatus and method of the aspects of the present invention, it is possible to effectively ensure the always stable sealing performance for the bending or deflection of the optical fiber preform, the outer diameter variation of the optical fiber preform in the longitudinal direction, or the outer diameter variation of the preform for each lot, and it is possible to avoid a situation where large bending occurs in the sending rod as in the case of the technique of PTL 1. In addition, a situation where the size of the apparatus is increased or the apparatus becomes complicated is less likely to occur.

DETAILED DESCRIPTION OF THE PREFERRED EMBODIMENTS

Hereinafter, embodiments of the present invention will be described in detail.

Figure 1:
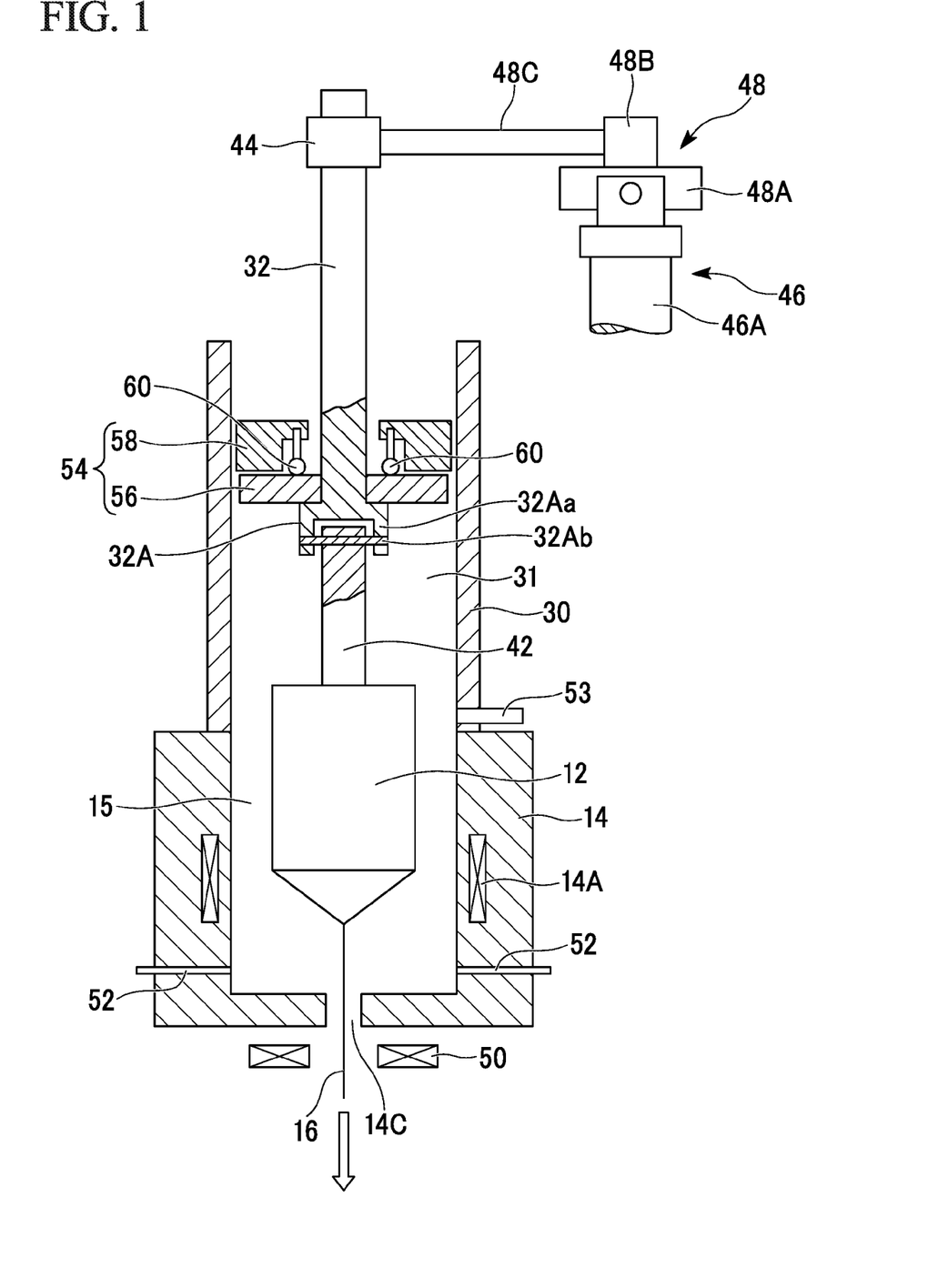
FIG. 1 is a schematic longitudinal sectional view showing the structure of a main part of an optical fiber manufacturing apparatus of a first embodiment of the present invention, especially, a structure near a drawing furnace and a shield pipe.
Figure 2:
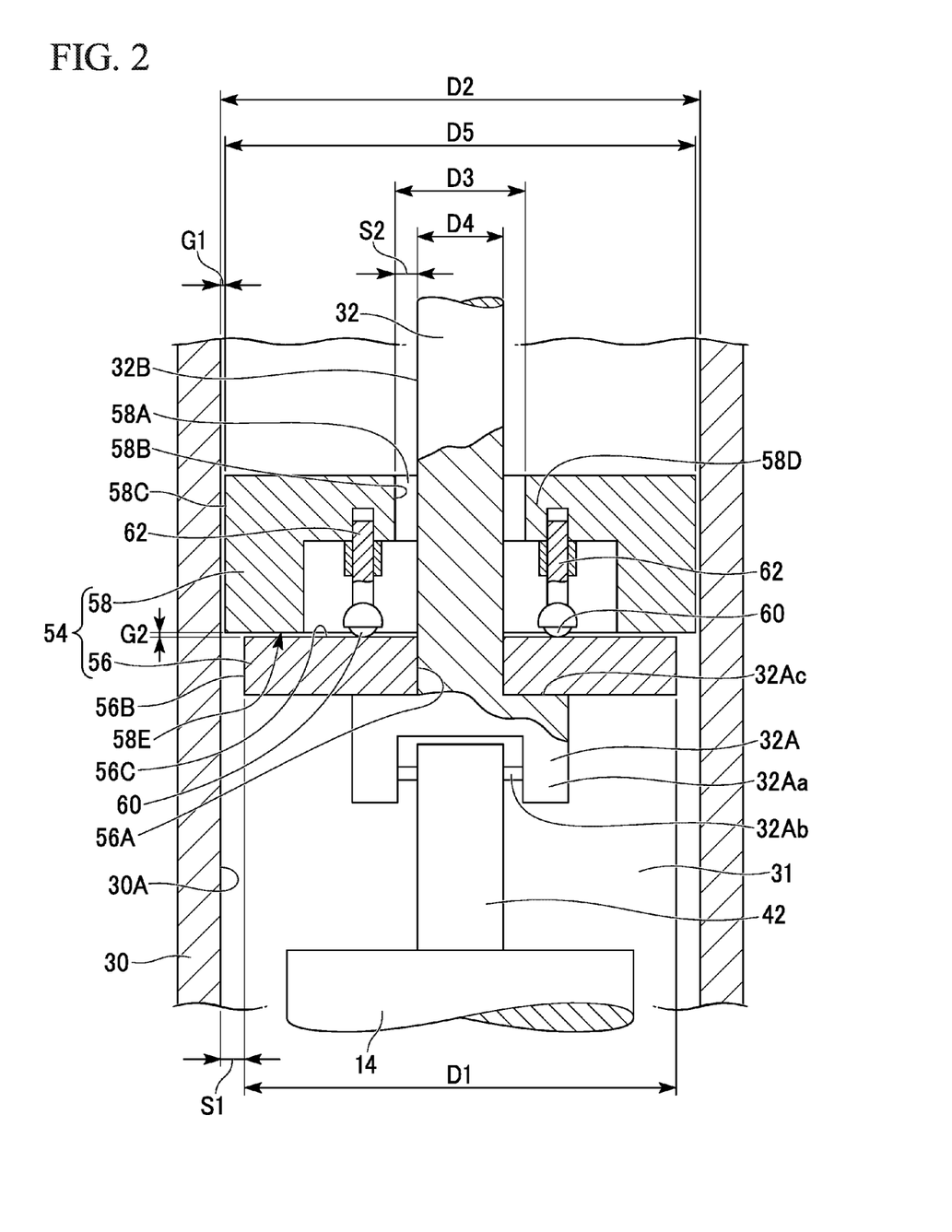
FIG. 2 is a schematic longitudinal sectional view showing the structure of the main part in FIG. 1, especially, the structure near the shield pipe in an enlarged manner.

FIG. 1 shows a main part of an optical fiber manufacturing apparatus of a first embodiment of the present invention, in particular, the vicinity of a drawing furnace 14 shown in FIG. 5, and FIG. 2 shows the structure of the main part (near a sealing member 54) shown in FIG. 1 in an enlarged manner.

In FIG. 1, a drawing furnace 14 for heating and softening an optical fiber preform 12 is formed in a hollow cylindrical shape as a whole, and includes a heater 14A. In addition, a heating space 15 for heating the optical fiber preform 12 is provided inside the drawing furnace 14, and the central axis of the heating space 15 is disposed along the vertical direction.

In this specification, "upper" means vertically upward and "lower" means vertically downward unless otherwise stated.

A hollow cylindrical shield pipe 30 is provided at the upper end of the drawing furnace 14. The shield pipe 30 is connected to the drawing furnace 14 so as to have a central axis matching the central axis of the drawing furnace 14 and to be continuous with the drawing furnace 14 without a gap therebetween. The inside of the shield pipe 30 is a space (hereinafter, referred to as a sealing space) 31 that is continuous with the heating space 15 in the drawing furnace 14.

At the time of drawing, the optical fiber preform 12 having, for example, a round bar shape is inserted into the heating space 15 of the drawing furnace 14 and the sealing space 31 of the shield pipe 30 from the upper side. Here, the optical fiber preform 12 has an upper end that is fused integrally with a dummy rod 42. An upper end of the dummy rod 42 is connected to a connecting portion 32A at the lower end of the sending rod 32. The connecting portion 32A includes a holding member 32Aa having, for example, a U shape when viewed from the lower side and a pin (or a threaded rod) 32Ab that is horizontally hung between the lower tips of the holding member 32Aa. The pin (or the threaded rod) 32Ab horizontally penetrates the upper end portion of the dummy rod 42. By the pin 32Ab, the dummy rod 42 and the optical fiber preform 12 integrated with the dummy rod 42 are hung from the sending rod 32.

An upper portion of the sending rod 32 is gripped by a gripping portion 44 such that the central axis of the sending rod 32 is vertical, and is supported so as to move up and down by a lifting mechanism 46. The position of the sending rod 32 can be adjusted in the X and Y directions within the horizontal plane by an alignment mechanism 48 interposed between the gripping portion 44 and the lifting mechanism 46. Only the basic configuration of the lifting mechanism 46 and the alignment mechanism 48 is shown in FIG. 1. As the lifting mechanism 46 and the alignment mechanism 48, any mechanism having the same mechanism used in the related art may be used, and the lifting mechanism 46 and the alignment mechanism 48 are not particularly limited. That is, in FIG. 1, as the alignment mechanism 48, a first adjustment table 48A whose position can be adjusted, for example, in the X direction within the horizontal plane is attached to the upper end of a lifting rod 46A driven by a lifting driving source (not shown) as the lifting mechanism 46. In addition, a second adjustment table 48B whose position can be adjusted, for example, in the Y direction within the horizontal plane is attached to the first adjustment table 48A, and the gripping portion 44 described above is provided at the tip of a support arm 48C extending horizontally from the second adjustment table 48B. The adjustment tables 48A and 48B can be moved linearly in the X and Y directions within the horizontal plane by servo motors (not shown) or the like, respectively.

A position detector 50, such as a laser position sensor, is disposed immediately below the drawing furnace 14, that is, on the lower side of a fiber pull-out opening 14C in the bottom portion of the heating furnace 14. The position detector 50 detects the position (horizontal position) of the bare optical fiber 16 pulled out (drawn) vertically downward from the fiber pull-out opening 14C.

One or two or more gas inlets 52 for introducing inert gas, such as argon gas, from the outside are provided at the appropriate positions of the drawing furnace 14 or the shield pipe 30. In FIG. 1, two gas inlets 52 are formed at the symmetrical positions of the lower portion of the drawing furnace 14. However, the position of the gas inlet is not limited to the above, and the gas inlet may be formed so that gas can be uniformly introduced (preferably, uniformly in the circumferential direction) into the heating space 15 and the sealing space 31 continuous with the heating space 15. In addition, a pressure sensor 53 for detecting the gas pressure in the heating space 15 and the sealing space 31 continuous with the heating space 15 is attached to a position near the upper end of the drawing furnace 14 (in the example shown in FIG. 1, the lower end of the shield pipe 30).

Hereinafter, the characteristic configuration of the present invention will be further described.

The sealing member 54 is disposed on the connecting portion 32A of the lower end of the sending rod 32 in the shield pipe 30. The sealing member 54 seals the heating space 15 and the sealing space 31 (space below an inner sealing body 56) continuous with the heating space 15 against the outer space while allowing the downward movement of the sending rod 32.

Basically, the sealing member 54 is configured by two members of the inner sealing body 56 on the lower side and an outer sealing body 58 on the upper side. In other words, the sealing member 54 in the present embodiment has a configuration that is vertically divided into two parts, unlike the sealing member 34 (refer to FIG. 6) shown in PTL 1. FIG. 2 shows the sealing member 54 and the vicinity thereof in an enlarged manner.

As shown in detail in FIG. 2, the inner sealing body 56 is formed in a horizontal disc shape as a whole. At the center of the inner sealing body 56, a through hole 56A passing therethrough vertically is formed. A lower portion of the sending rod 32 is inserted into the through hole 56A, and the inner sealing body 56 is horizontally mounted and fixed to the upper surface of the connecting portion 32A formed at the lower end of the sending rod 32. That is, a shoulder top surface 32Ac of the holding member 32Aa in the connecting portion 32A is a horizontal plane, and the inner sealing body 56 is horizontally mounted and fixed so as to be in contact with the shoulder top surface 32Ac.

The outer diameter D1 of the inner sealing body 56 is set to a diameter smaller than the inner diameter D2 of the shield pipe 30 by a predetermined amount (twice the space S1) so that the space S1 having a predetermined width, for example, a width of approximately 5 mm or more is maintained between the outer peripheral surface 56B of the inner sealing body 56 and the inner peripheral surface 30A of the shield pipe 30. In other words, the inner sealing body 56 is sufficiently spaced apart from the inner peripheral surface 30A of the shield pipe 30 by the space S1. Here, "inner sealing body 56 is sufficiently spaced apart" means that the outer peripheral surface 56B of the inner sealing body 56 is spaced apart so as not to be in contact with the inner peripheral surface 30A of the shield pipe 30 by movement in the horizontal direction of the inner sealing body 56 according to the movement of the sending rod 32 even when the sending rod 32 is maximally moved in the horizontal direction for the alignment as will be described later.

The outer sealing body 58 is formed in a short cylindrical shape or a disc shape as a whole. At the center of the outer sealing body 58, a through hole 58A through which the sending rod 32 passes is formed. The outer sealing body 58 is mounted and held so as to be movable in the X and Y directions within the horizontal plane with respect to the inner sealing body 56 on a horizontal upper surface 56C of the inner sealing body 56 in a state in which the sending rod 32 is inserted into the through hole 58A.

The inner diameter D3 of the through hole 58A of the outer sealing body 58 is set to a diameter larger than the outer diameter D4 of the sending rod 32 by a predetermined amount (twice the space S2) so that the space S2 having a predetermined width, for example, a width of approximately 5 mm or more is maintained between the inner peripheral surface 58B of the through hole 58A and the outer peripheral surface 32B of the sending rod 32. In other words, the outer sealing body 58 is sufficiently spaced apart from the sending rod 32 by the space S2. Here, "outer sealing body 58 is sufficiently spaced apart" means that the sending rod 32 is spaced apart so as not to be in contact with the inner peripheral surface 58B of the outer sealing body 58 even when the sending rod 32 is maximally moved in the horizontal direction for the alignment as will be described later.

On the other hand, a gap G1 between the outer peripheral surface 58C of the outer sealing body 58 and the inner peripheral surface 30A of the shield pipe 30 is a surface to seal the heating space 15 and the sealing space 31 continuous with the heating space 15 against the outer space while allowing the leakage of a very small amount of gas from the sealing space 31. Therefore, the outer diameter D5 of the outer sealing body 58 is a diameter that is very slightly smaller than the inner diameter D2 of the shield pipe 30. Specifically, as will be described later, the outer diameter D5 of the outer sealing body 58 is set such that the gap G1 becomes a very small gap of, preferably, approximately 0.01 mm to 1.0 mm.

The specific configuration for mounting and holding the outer sealing body 58 so as to be movable in the X and Y directions within the horizontal plane with respect to the inner sealing body 56 on the horizontal upper surface 56C of the inner sealing body 56 is not particularly limited. In the case of the first embodiment shown in FIGS. 1 and 2, the outer sealing body 58 is held by a ball transfer (free bearing) 60 that is supported so as to be movable in a direction of 360° within the horizontal plane. That is, a stepped notch portion that is a space notched in a stepped shape is formed in a lower portion on the inner peripheral side of the outer sealing body 58, and a plurality of ball transfers 60 are hung from an upper portion 58D of the stepped notch portion through an adjustment shaft 62 along the vertical direction. In addition, the tip (lower end) of the ball transfer 60 is in contact with the horizontal upper surface 56C of the inner sealing body 56. Here, the number of ball transfers 60 is usually three or more, and the ball transfers 60 are disposed at equal distances in the circumferential direction of the outer sealing body 58. The adjustment shaft 62 can adjust the position of the ball transfer 60 in the vertical direction. As the adjustment shaft 62, for example, a threaded rod that can move back and forth in the vertical direction with respect to the upper portion 58D of the stepped notch portion of the outer sealing body 58 may be used.

Thus, by adjusting the position of the ball transfer 60 in the vertical direction using the adjustment shaft 62, it is possible to adjust the width of a gap G2 between an upper surface 56C of the inner sealing body 56 on the lower side and a lower surface 58E of the outer sealing body 58 on the upper side. That is, similar to the gap G1, the gap G2 is also a place to seal the heating space 15 and the sealing space 31 continuous with the heating space 15 against the outer space (seals the heating space 15 and the sealing space 31 while allowing the leakage of a very small amount of gas). As will be described later, it is desirable that the gap G2 is adjustable in the range of 0.01 mm to 1.0 mm, for example.

By drawing the optical fiber preform 12 as follows using the optical fiber manufacturing apparatus of the present embodiment described above, it is possible to obtain the bare optical fiber 16. The upper end of the dummy rod 42 fused in advance to the optical fiber preform 12 is attached to the sending rod 32 through the connecting portion 32A. Then, the sending rod 32 is gripped by the gripping portion 44. Then, the optical fiber preform 12 is lowered from the upper side of the shield pipe 30 so as to be inserted into the shield pipe 30 and the drawing furnace 14. In addition, the sealing member 54 formed by the inner sealing body 56 and the outer sealing body 58 is attached to the lower portion of the sending rod 32. The adjustment shaft 62 of the ball transfer 60 is adjusted in advance so that the gap G2 between the upper surface 56C of the inner sealing body 56 and the lower surface 58E of the outer sealing body 58 is in the range of, preferably, 0.01 mm to 1.0 mm.

Then, the optical fiber preform 12 is heated by the heater 14A while introducing inert gas, such as argon gas, into the heating space 15 and the sealing space 31 continuous with the heating space 15 from the gas inlet 52, thereby softening and melting the optical fiber preform 12. Then, the softened and melted optical fiber preform 12 is pulled out linearly downward from the fiber pull-out opening 14C as the bare optical fiber 16.

When drawing the bare optical fiber 16 as described above, the sending rod 32 is gradually lowered by the lifting mechanism 46. At the same time, the horizontal position (X and Y directions) of the bare optical fiber 16 pulled out from the fiber pull-out opening 14C is detected by the position detector 50. Then, drawing is performed while adjusting the horizontal position (X and Y directions) of the sending rod 32 using the alignment mechanism 48 such that the pull-out position of the bare optical fiber 16 matches the central axis position of the die of the coating device located on the lower side. That is, when there is deflection or bending in the optical fiber preform 12, the dummy rod 42, or the sending rod 32, even if the pull-out position of the bare optical fiber 16 is set so as to match the central axis position of the die of the coating device in the initial state, the pull-out position of the bare optical fiber 16 may gradually deviate from the central axis position of the die due to the aforementioned deflection or bending as the drawing progresses. Therefore, drawing is performed while adjusting (aligning) the horizontal position of the sending rod 32 using the alignment mechanism 48 such that the pull-out position of the bare optical fiber 16 always matches the central axis position of the die. In particular, when the optical fiber preform 12 is large, the deflection or bending may increase. For this reason, alignment is important.

Thus, when the sending rod 32 is moved in the horizontal direction for the alignment, the inner sealing body 56 attached to the lower end of the sending rod 32 is moved in the horizontal direction together with the sending rod 32, but the large space S1 is present between the outer peripheral surface 56B of the inner sealing body 56 and the inner peripheral surface 30A of the shield pipe 30. Therefore, even if the inner sealing body 56 moves in the horizontal direction, a situation where the horizontal movement of the inner sealing body 56 is inhibited due to the outer peripheral surface 56B being in contact with the inner peripheral surface 30A of the shield pipe 30 does not occur. Even if the inner sealing body 56 moves in the horizontal direction, a situation where the horizontal movement of the sending rod 32 for the alignment is not inhibited does not occur.

The outer sealing body 58 is supported so as to be movable relatively in the horizontal direction with respect to the inner sealing body 56. Therefore, even if the inner sealing body 56 moves in the horizontal direction due to the horizontal movement of the sending rod 32 for the alignment, the outer sealing body 58 does not move substantially. In addition, the large space S2 is present between the inner peripheral surface 58B of the outer sealing body 58, and the outer peripheral surface 32B of the sending rod 32. Therefore, when the sending rod 32 is moved in the horizontal direction, the sending rod 32 is not in contact with the inner peripheral surface 58B of the outer sealing body 58. Accordingly, the horizontal movement of the sending rod 32 for the alignment is not inhibited by the outer sealing body 58.

In addition, between the outer peripheral surface 58C of the outer sealing body 58 and the inner peripheral surface 30A of the shield pipe 30, only the extremely small gap G1 which is enough to allow the lowering of the outer sealing body 58 with respect to the shield pipe 30 and allow the passage of gas at a very small flow rate (that is, to the extent that the sealing performance can be ensured) is present. Accordingly, the outer sealing body 58 does not move in a substantially horizontal direction.

Here, gas introduced from the gas inlet 52 is filled in the heating space 15 and the sealing space 31 continuous with the heating space 15. In addition, the gas leaks to the space opened to the outside above the shield pipe 30 through the small gap G1 between the outer peripheral surface 58C of the outer sealing body 58 and the inner peripheral surface 30A of the shield pipe 30. A part of the gas escapes to the space opened to the outside above the shield pipe 30 through the large space S2 between the inner peripheral surface 58B of the outer sealing body 58 and the outer peripheral surface of the outer sealing body 58 after passing through the small gap G2 between the upper surface 56C of the inner sealing body 56 and the lower surface 58E of the outer sealing body 58. In other words, the heating space 15 and the sealing space 31 continuous with the heating space 15 are sealed by the gaps G1 and G2 while allowing the leakage at a small flow rate.

Incidentally, if the size of the small gap G1 between the outer peripheral surface 58C of the outer sealing body 58 and the inner peripheral surface 30A of the shield pipe 30 and the size of the small gap G2 between the upper surface 56C of the inner sealing body 56 and the lower surface 58E of the outer sealing body 58 are fixed, the amount of gas leaking to the outer space above the shield pipe 30 from the heating space 15 and the sealing space 31 is constant over time. In addition, the amount of leakage from each portion in the circumferential direction of the shield pipe 30 is also uniform. Therefore, the flow of gas in the heating space 15 and the sealing space 31 is stabilized (that is, the sealing performance is stable). As a result, since the temperature distribution in the heating space 15 is stabilized and the temperature is always uniform in the circumferential direction, heating of the optical fiber preform 12 is stabilized and is uniformly performed.

Here, in the case of the sealing member 34 (refer to FIG. 6) formed of a single component as shown in PTL 1, if the sending rod 32 provided at the center moves in the horizontal direction, the sealing member 34 also moves with the sending rod 32. However, the sealing member 34 can only be moved by an amount equal to the clearance between the sealing member 34 and the shield pipe 30. The clearance is usually set to approximately 1 mm or less in order to ensure the sealing performance. Accordingly, the sealing member 34 can only move in the range of ±1 mm or less. If the sealing member 34 moves more, excessive force is applied to the sending rod 32. As a result, the sending rod 32 is bent. Needless to say, if the clearance between the sealing member 34 and the shield pipe 30 is set to be large, large movement exceeding approximately ±1 mm of the sealing member 34 according to the movement of the sending rod 32 in the horizontal direction is allowed. Therefore, the occurrence of bending of the sending rod 32 is also avoided. In this case, however, a sealing performance problem occurs.

In contrast, in the present embodiment, the sealing member 54 is divided into two parts (inner sealing body 56 on the lower side and outer sealing body 58 on the upper side), and sealing is performed by (gap G1) between the outer sealing body 58 and the inner sealing body 56 and (gap G2) between the outer sealing body 58 and the shield pipe 30. In addition, the outer sealing body 58 can move relatively in the horizontal direction with respect to the inner sealing body 56 that moves with the horizontal movement of the sending rod 32. Therefore, the aforementioned problem of the technique of PTL 1 is solved. That is, even if the sending rod 32 moves in the horizontal direction, the outer sealing body 58 does not move substantially. For this reason, the occurrence of bending of the sending rod 32 is avoided since the large movement of the sending rod 32 in the horizontal direction is allowed, and the gap G1 between the outer sealing body 58 and the inner sealing body 56 and the gap G2 between the outer sealing body 58 and the shield pipe 30 can be stably maintained. Therefore, it is possible to stabilize the sealing performance.

It is desirable to adjust the gap G2 between the upper surface 56C of the inner sealing body 56 and the lower surface 58E of the outer sealing body 58 in a range of 0.01 mm to 1.0 mm as previously described. Similarly, it is desirable to adjust the gap G1 between the outer peripheral surface 58C of the outer sealing body 58 and the inner peripheral surface 30A of the shield pipe 30 in a range of 0.01 mm to 1.0 mm.

The gap G2 between the inner sealing body 56 and the outer sealing body 58 is required in order to ensure the stable sealing performance between the inner sealing body 56 and the outer sealing body 58 while allowing the relative movement between the inner sealing body 56 and the outer sealing body 58 in the horizontal direction. In addition, the gap G1 between the outer sealing body 58 and the shield pipe 30 is required in order to ensure the stable sealing performance between the outer sealing body 58 and the shield pipe 30 while allowing the relative movement in the vertical direction with respect to the shield pipe 30.

When the gaps G1 and G2 are less than 0.01 mm, it is not possible to ensure the parallelism of the gaps depending on the manufacturing accuracy of components. This may cause contact with any portion of the counterpart side, and accordingly, smooth movement may not be possible. In some cases, sealing in the gaps G1 and G2 is too perfect. In this case, little (or no) gas leaks from the gaps. Accordingly, it is difficult to limit the gas pressure at the upper end of the drawing furnace 14, which will be described later, to 500 Pa or less. On the other hand, if the gaps G1 and G2 exceed 1.0 mm, there is a risk that the sealing performance will not be sufficient. That is, it may be difficult to set the gas pressure at the upper end of the drawing furnace 14 to 5 Pa or more, or the gas outflow from the gaps G1 and G2 may become uneven in the circumferential direction.

For the relationship between the outer sealing body 58 on the upper side and the inner sealing body 56 on the lower side, it is preferable that the outer sealing body 58 on the upper side can move relatively in the horizontal direction with respect to the inner sealing body 56 and the aforementioned gap G2 can be ensured. In addition, the size of the gap G2 is preferably adjustable. In the first embodiment shown in FIGS. 1 and 2, the ball transfer (free bearing) 60 interposed between the inner sealing body 56 on the lower side and the outer sealing body 58 on the upper side is disposed downward. That is, the adjustment shaft 62 is hung from the outer sealing body 58 on the upper side and the ball transfer 60 is attached to the lower end of the adjustment shaft 62, so that the distal surface of the ball transfer 60 is in contact with the upper surface 56C of the inner sealing body 56 on the lower side. In addition, by adjusting the position of the ball transfer 60 in the vertical direction using the adjustment shaft 62, it is possible to adjust the gap G2.

Figure 3:
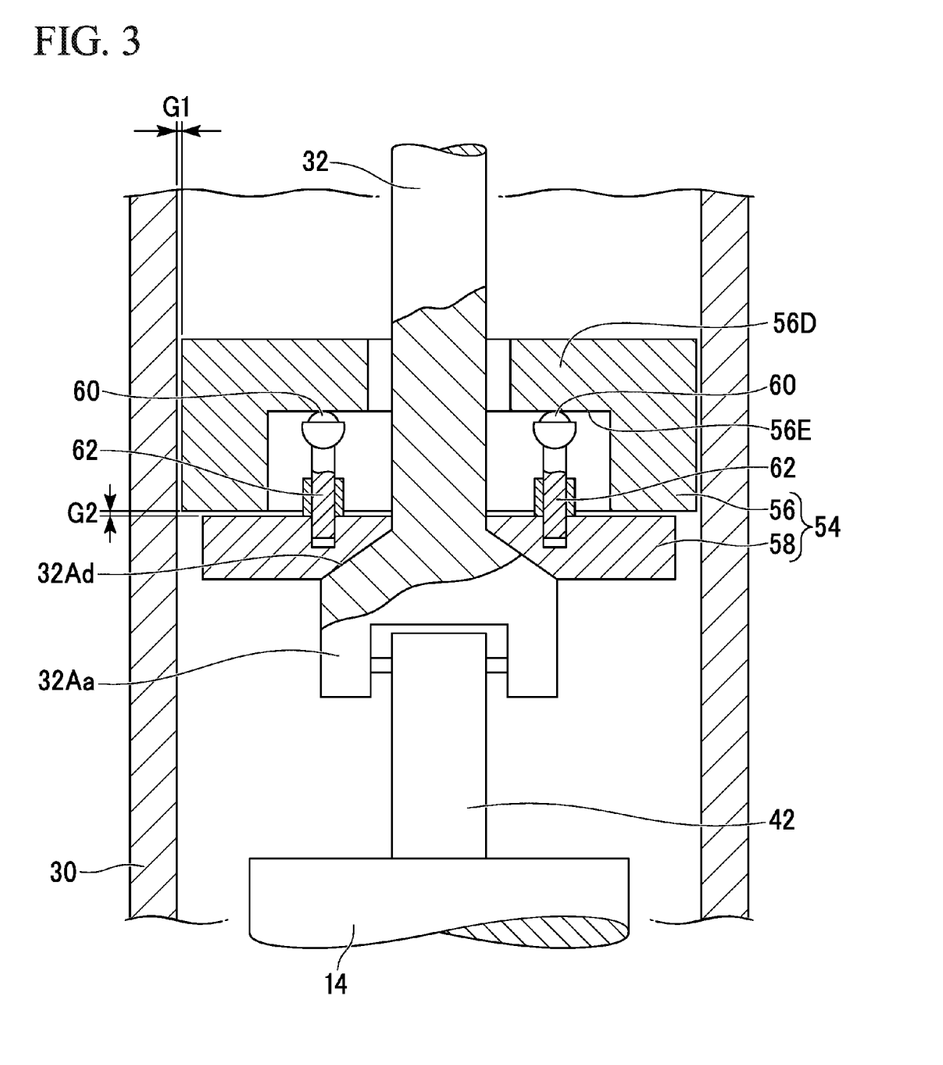
FIG. 3 is a schematic longitudinal sectional view showing the structure of a main part of an optical fiber manufacturing apparatus of a second embodiment of the present invention, especially, a structure near a shield pipe in an enlarged manner similar to FIG. 2.

In some cases, however, the ball transfer 60 may be upwardly disposed as shown as a second embodiment in FIG. 3. That is, the adjustment shaft 62 is made to protrude vertically upward from the inner sealing body 56 on the lower side. In addition, the ball transfer 60 may be attached to the upper end of the adjustment shaft 62, so that the distal surface of the ball transfer 60 is in contact with a lower surface 56E of the upper portion 58D of the outer sealing body 58 on the upper side.

In both of the first embodiment shown in FIGS. 1 and 2 and the second embodiment shown in FIG. 3, the ball transfer 60 is attached to the tip of the adjustment shaft 62. In some cases, however, the fixed side housing of the ball transfer 60 may be directly attached to the outer sealing body 58 on the upper side or to the inner sealing body 56 on the lower side without an adjustment shaft.

Figure 4:
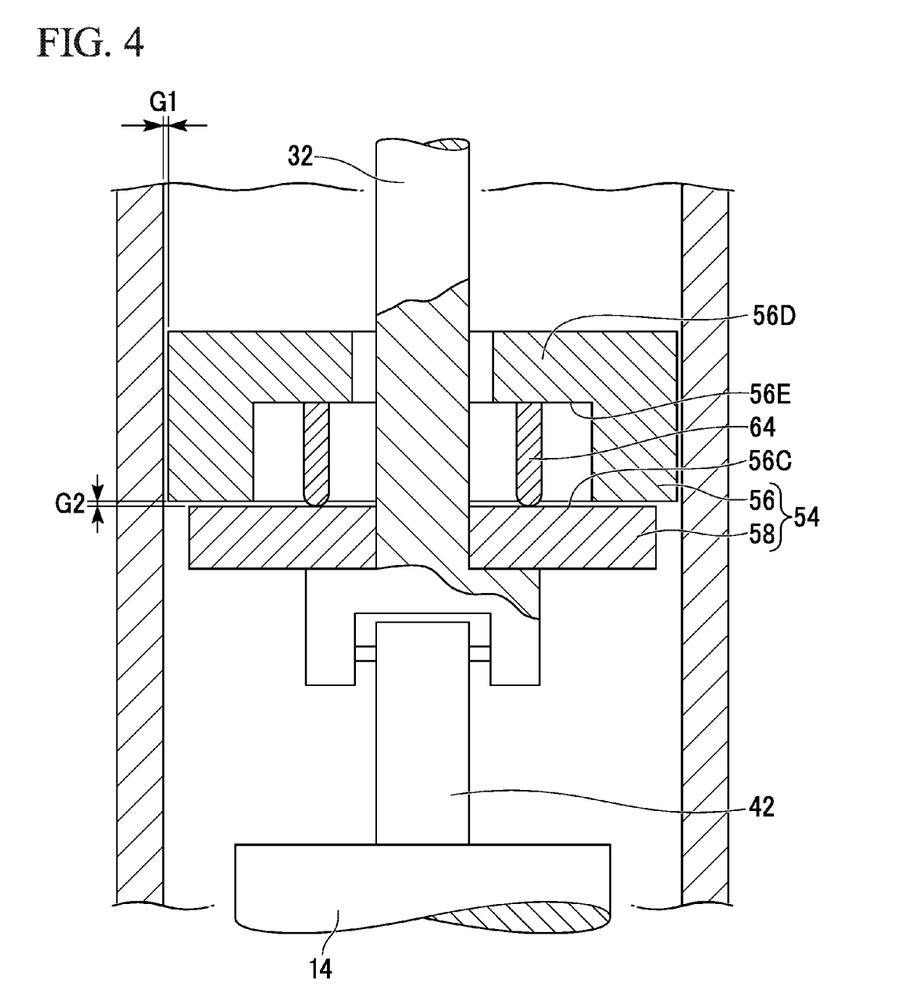
FIG. 4 is a schematic longitudinal sectional view showing the structure of a main part of an optical fiber manufacturing apparatus of a third embodiment of the present invention, especially, a structure near a shield pipe in an enlarged manner similar to FIG. 2.

In addition, instead of providing the ball transfer 60, as shown as a third embodiment in FIG. 4, a contact member 64 having any other shapes, such as a rod shape, may be hung from the outer sealing body 58 on the upper side, that the lower end of the contact member 64 is in contact with the upper surface 56C of the inner sealing body 56 on the lower side. Alternatively, although not shown, the contact member 64 may be made to protrude vertically upward from the inner sealing body 56 on the lower side contrary to the above, so that the upper end of the contact member 64 is in contact with the lower surface 56E of an upper portion 56D of the outer sealing body 58 on the upper side. In this case, it is desirable that the frictional resistance of the tip of the contact member 64 against the counterpart side is sufficiently small. Therefore, it is desirable to perform fluorine resin based low-friction coating or frictional resistance reduction processing, such as hard plating treatment or mirror finishing, on the surface of the tip of the contact member 64. Even if the ball transfer is not used as described above, it is preferable that the length of the contact member 64 (hanging length from the outer sealing body 58 on the upper side or the protruding height from the inner sealing body 56 on the lower side) is adjustable, even though not particularly shown. In this manner, it is possible to adjust the gap G2.

In the first embodiment shown in FIGS. 1 and 2, the inner sealing body 56 is mounted on the horizontal shoulder top surface 32Ac of the holding member 32Aa in the connecting portion 32A of the lower end of the sending rod 32. However, the configuration for holding the inner sealing body 56 in the lower portion of the sending rod 32 is not particularly limited. For example, as shown as the second embodiment in FIG. 3, the upper surface of the holding member 32Aa in the connecting portion 32A may be set to a tapered surface 32Ad, so that the reverse tapered surface of the inner sealing body 56 fits to the tapered surface 32Ad. Alternatively, although not shown, the lower end of the sending rod 32 may be threaded in a screw shape, and the inner sealing body 56 may be screwed to the threaded portion.

The materials of the inner sealing body 56, the outer sealing body 58, and the ball transfer 60 (or the contact member 64) are not particularly limited. Stainless steel, brass, aluminum, steel, and the like can be used. Preferably, anti-rust treatment, coating for friction reduction (for example, fluorine resin based coating), curing processing such as quenching, mirror finishing, and the like are appropriately performed on these members. In addition, although not shown, in order to prevent radiant heat from the drawing furnace 14, a heat insulating member, such as carbon, may be provided on the lower surface of the inner sealing body 56 or the like.

The frictional force between the outer sealing body 58 on the upper side and the inner sealing body 56 on the lower side in the sealing member 54, especially, the frictional force between the ball transfer 60 (or the contact member 64) and the counterpart material is preferably as small as possible. That is, if the frictional force between these members is large, when adjusting the position of the sending rod 32 through the movement in the horizontal direction for the alignment, deflection occurs in the sending rod 32 itself until a force exceeding the frictional force is stored. Then, the sending rod 32 moves in a direction in which the bending of the sending rod 32 is released at a stretch when the repulsive force against the deflection exceeds the frictional resistance. For this reason, the movement in the horizontal direction is distorted. In the worst case, the movement of the sending rod 32 in the horizontal direction vibrates in all directions. Accordingly, it is desirable to use a material, which has a low coefficient of friction so that the amount of deflection of the sending rod is equal to or less than the required accuracy for the alignment of the preform position, for each of the members (or the surfaces) described above. If the frictional force is zero, the amount of deflection is theoretically 0 μm. Accordingly, for example, when the accuracy of aligning the preform position in the range of 50 μm square within the horizontal plane is required, the amount of deflection of the sending rod 32 needs to be 50 μm or less. Therefore, it is desirable to select the length of the sending rod and the coefficient of friction between the contact surfaces of the aforementioned members so as not to exceed such an amount of deflection. In addition, it is desirable to set the alignment mechanism 48 such that the alignment possible range (alignment range) of the sending rod 32 in the horizontal direction is larger than the assumed maximum range (maximum deflection range) of the deflection of the sending rod 32 in the horizontal direction.

When drawing the optical fiber preform 12 using the manufacturing apparatus described above, it is desirable to heat the optical fiber preform 12 while adjusting the gas pressure in the drawing heating furnace 14 at the upper end of the drawing furnace 14 in the range of 5 Pa to 500 Pa. In FIG. 1, the pressure sensor 53 is provided at the lower end of the shield pipe 30 to measure the pressure at the lower end of the shield pipe 30. However, the measured pressure at the lower end of the shield pipe 30 is almost the same as the pressure at the upper end of the drawing furnace 14 substantially. Accordingly, the pressure measurement value by the pressure sensor 53 at the lower end of the shield pipe 30 can be regarded as the pressure at the upper end of the drawing furnace 14.

"Gas pressure at the upper end position of the drawing furnace 14 is less than 5 Pa" means poor sealing performance. In this case, mixture of air or dust from the outside, turbulence of the flow of gas in the furnace due to the inflow of gas from the fiber pull-out opening 14C at the bottom of the drawing furnace 14, or the like occurs due to the influence of a reduction in the furnace pressure that occurs since the gas in the drawing furnace 14 leaks to the outside at a high flow rate. As a result, outer diameter variation or strength failure of the bare optical fiber may occur, and this may cause a reduction in the manufacturing yield of the optical fiber.

On the other hand, "gas pressure at the upper end of the drawing furnace 14 exceeds 500 Pa" means too high sealing performance. In that case, gas in the furnace is difficult to leak to the outside. For this reason, if the amount of gas flowing into the furnace is too large, turbulence of the flow of gas in the furnace or the like occurs. As a result, there is a reduction in the manufacturing yield of the optical fiber. In the worst case, it is not possible to manufacture non-defective products.

In order to adjust the gas pressure in the drawing heating furnace 14 at the upper end of the drawing furnace 14 in the range of 5 Pa to 500 Pa, it is preferable to adjust either or both of the gap G1 between the outer peripheral surface 58C of the outer sealing body 58 in the sealing member 54 and the inner peripheral surface 30A of the shield pipe 30 and the gap G2 between the upper surface 56C of the inner sealing body 56 in the sealing member 54 and the lower surface 58E of the outer sealing body 58 that have already been described. In addition, it is preferable to adjust the flow rate of gas introduced into the drawing furnace 14. For example, when the gas pressure is less than 5 Pa, it is preferable to narrow at least one of the gaps G1 and G2 or to increase the flow rate of gas introduced. In contrast, when the gas pressure exceeds 500 Pa, it is preferable to expand at least one of the gaps G1 and G2 or to reduce the flow rate of gas introduced.

Here, adjustment of the gap G1 between the outer peripheral surface 58C of the outer sealing body 58 in the sealing member 54 and the inner peripheral surface 30A of the shield pipe 30 can be performed by replacing the outer sealing body 58 with that having a different outer diameter. On the other hand, adjustment of the gap G2 between the upper surface 56C of the inner sealing body 56 and the lower surface 58E of the outer sealing body 58 can be performed by adjusting the position of the ball transfer 60 (or the contact member 64) as previously described.

Hereinafter, examples of the optical fiber manufacturing method of the present invention will be described together with comparative examples.

EXAMPLES

Example 1

Example 1 is an example in which an optical fiber was actually manufactured by applying the structure shown in FIGS. 1 and 2 to the optical fiber manufacturing apparatus shown in FIG. 5.

The specific apparatus configuration used in the manufacturing of the optical fiber is as follows.

That is, an optical fiber position detecting sensor was placed in two axes (X axis-Y axis) immediately below the drawing furnace (only one axis is shown). The position detecting sensors of these two axes were perpendicular to each other, and were formed of a light source and a detector, respectively. In the used optical fiber preform, there was a variation of $\phi$140 mm to $\phi$160 mm in the outer diameter distribution in the longitudinal direction. The inner diameter of the shield pipe was $\phi$200 mm. When the optical fiber preform was attached to the center of the shield pipe, the gap between the preform and the shield pipe was at least 20 mm. The inner sealing body of the sealing member was formed so as to be movable by ±10 mm in the directions of the two axes (X and Y axes). Accordingly, the optical fiber preform and the shield pipe are not in contact with each other. The gap G2 between the inner sealing body and the outer sealing body was set to 0.1 mm by adjusting the adjustment shaft of the ball transfer. The gap G1 between the outer sealing body and the shield pipe was set to 0.1 mm. As a result, the pressure at the upper end of the drawing furnace was 100 Pa as will be described later. Low-friction fluorine resin based coating was performed on the outer peripheral surface of the outer sealing body, so that the outer peripheral surface of the outer sealing body slid smoothly even if the outer peripheral surface of the outer sealing body was in contact with the shield pipe. SUS440C was used as the inner sealing body and the outer sealing body of the sealing member, and was quenched. In addition, in order to prevent radiant heat from the drawing furnace, a carbon component was attached to the lower surface of the inner sealing body. The maximum deflection amount when moving the sending rod was 10 µm. The sending rod can be moved in the X and Y directions within the horizontal plane by an alignment mechanism configured to include a stepping motor, a linear guide, a ball screw, and the like (not shown).

Using the apparatus having such a configuration, the optical fiber preform was heated to approximately 2000° C. while introducing argon gas into the drawing furnace from four places in the circumferential direction, and the bare optical fiber having an outer diameter of $\phi$125 µm was drawn at the drawing speed of 2000 m/min. In addition, a protective coating layer was formed on the obtained bare optical fiber, thereby manufacturing the optical fiber of $\phi$250 µm. The flow rate of argon gas introduced into the drawing furnace was 20 SLM, and the pressure of the upper portion of the heating furnace was almost constant at 100 Pa.

The position of the bare optical fiber at the time of manufacturing was detected by the position detecting sensor, and the alignment program was set such that the position of the bare optical fiber fell within the range of ±100 µm for both of the X and Y axes with the center position of the drawing furnace as a zero point. That is, when ±100 µm was exceeded, control was performed such that the position of the bare optical fiber fell within the adjustment range of ±100 μm by moving the sending rod in the horizontal direction. As a result, good drawing was possible over the entire length of the bare optical fiber.

In addition, as a result of the inspection of the optical fiber after manufacturing, variations in the diameter of the bare fiber were small, and the eccentricity of coating could be maintained small. In addition, the clad non-circularity (outer diameter non-circularity) of the bare optical fiber could be maintained small. In addition, strength failure did not occur. It is thought that the evaluations of the fiber diameter and the strength failure were good since the pressure of the upper portion of the drawing furnace could be appropriately maintained.

For the eccentricity, since the position of the bare optical fiber drawn from the optical fiber preform was always uniformly controlled in the range of ±100 μm square, it is thought that the position of the bare optical fiber introduced into the resin coating device was always constant. For the clad non-circularity, since the preform position was a center position in the drawing furnace, it is thought that heat was uniformly applied in the circumferential direction of the optical fiber preform.

Example 2

Example 2 is an example in which an optical fiber was actually manufactured by applying the structure shown in FIG. 3 to the optical fiber manufacturing apparatus shown in FIG. 5.

As the apparatus configuration, the sealing member in Example 1 was changed to the sealing member shown in FIG. 3. Others are basically the same as in Example 1 except the following points were changed. The gap G2 between the outer sealing body and the inner sealing body was set to 0.01 mm by adjusting the adjustment shaft of the ball transfer. Similarly, the outer sealing member and the shield pipe were replaced with members between which the gap G1 was 0.01 mm. As a result, the pressure at the upper end of the drawing furnace was 500 Pa. Brass was used as the inner sealing body and the outer sealing body of the sealing member. In addition, in order to prevent radiant heat from the drawing furnace, a carbon component was attached to the lower surface of the inner sealing member. The maximum deflection amount when moving the sending rod was 20 μm. Therefore, the alignment program was set such that the position of the bare optical fiber fell within the range of ±20 μm for both of the X and Y axes. As a result, in the same manner as in Example 1, all of the fiber diameter, eccentricity, and clad non-circularity were good, and strength failure did not occur.

Example 3

Example 3 is an example in which an optical fiber was actually manufactured by applying the structure shown in FIG. 4 to the optical fiber manufacturing apparatus shown in FIG. 5.

As the apparatus configuration, the sealing member in Example 1 was changed to the sealing member shown in FIG. 4, that is, a configuration in which no ball transfer is used (contact member 64 is used). Fluorine resin based coating was performed on the distal surface of the contact member 64, the upper surface of the inner sealing body, and the lower surface of the outer sealing body. The gap G2 between the inner sealing body and the outer sealing body was set to 1 mm, and the gap G1 between the outer sealing body and the shield pipe was set to 1 mm. As a result, the pressure at the upper end of the drawing furnace was 5 Pa. Aluminum was used as the inner sealing body and the outer sealing body of the sealing member. In addition, in order to prevent radiant heat from the drawing furnace, a carbon component was attached to the lower surface of the inner sealing member. The maximum deflection amount when moving the sending rod was 100 μm. Therefore, the alignment program was set such that the position of the bare optical fiber fell within the range of ±150 μm for both of the X and Y axes. As a result, in the same manner as in Example 1, all of the fiber diameter, eccentricity, and clad non-circularity were good, and strength failure did not occur.

Comparative Example 1

Comparative example 1 is an example in which the gaps G1 and G2 are large and the sealing performance is poor.

That is, in Example 1, gap adjustment was performed as follows. The gap (gap in the horizontal direction) G2 between the outer sealing body and the inner sealing body was set to 2 mm, and the gap G1 between the outer sealing body and the shield pipe was set to 2 mm. As a result, the pressure at the upper end of the drawing furnace was 3 Pa.

Other conditions were the same as in Example 1, and drawing was performed. However, the fiber diameter (bare fiber diameter) was not stable during drawing, and good optical fiber was not obtained.

Comparative Example 2

Comparative example 2 is an example in which the gaps G1 and G2 were too small and the sealing performance was too high.

That is, in Example 2, gap adjustment was performed as follows. The gap (gap in the horizontal direction) G2 between the outer sealing body and the inner sealing body was set to 0.005 mm. The gap G1 between the outer sealing body and the shield pipe was set to 0.005 mm. As a result, the pressure of the upper portion of the drawing furnace was 600 Pa.

Other conditions were the same as in Example 2, and drawing was performed. However, the fiber diameter (bare fiber diameter) was not stable during drawing, and good optical fiber was not obtained. In addition, the manufactured optical fiber was inspected, and did not exhibit poor strength.

Comparative Example 3

Comparative example 3 is an example in which the frictional resistance between the inner sealing body and the outer sealing body was large and large deflection occurred in the sending rod.

That is, in Example 3, fluorine resin based coating was performed on the distal surface of the contact member 64, the upper surface of the inner sealing body, and the lower surface of the outer sealing body in the sealing member shown in FIG. 4. As a result, the maximum deflection amount when moving the sending rod was 500 μm. Other conditions were the same as in Example 3, and drawing was performed. However, an alignment operation was not stable during drawing, and the vibration of about ±1 mm was repeated. As a result, the manufactured optical fiber was measured, and the eccentricity and the clad non-circularity were changed in the longitudinal direction and the degradation of the product quality was observed.

While the preferred embodiments and examples of the present invention have been described, it is needless to say that the present invention is not limited to these embodiments and examples. That is, addition, omission, and replacement of the configuration and other modifications could be made without departing from the spirit and scope of the present invention.

What is claimed is:

1. An optical fiber manufacturing apparatus, comprising:
    a drawing furnace that forms a heating space and is configured to heat and melt a silica based optical fiber preform in the heating space;
    a cylindrical shield pipe that is provided above the drawing furnace, forms a space continuous with the heating space in a vertical direction, and has an inner peripheral surface;
    a sending rod that has a lower end attached to the optical fiber preform and a lower portion disposed inside the shield pipe, and is configured to insert the optical fiber preform into the heating space in the vertical direction;
    an alignment mechanism that is configured to move the sending rod in a horizontal direction;
    an inner sealing body that is attached to the lower portion of the sending rod and moves in the horizontal direction with movement of the sending rod in the horizontal direction; and
    an outer sealing body that has an outer peripheral surface, is mounted on the inner sealing body, is configured to move in the horizontal direction with respect to the inner sealing body, is spaced apart from the sending rod, and is configured to move in the vertical direction with respect to the inner peripheral surfaces of the shield pipe,
    wherein the inner sealing body and the outer sealing body are disposed such that a space below the inner sealing body is sealed against an outer space above the shield pipe, and a bare optical fiber is formed by heating the optical fiber preform while introducing gas into the heating space and pulling out the softened optical fiber preform linearly downward from the drawing furnace, the bare optical fiber is cooled and solidified, and then a resin coating layer is formed on an outer periphery of the bare optical fiber to complete an optical fiber.

2. The optical fiber manufacturing apparatus according to claim 1,
    wherein a gap between the inner sealing body and the outer sealing body is adjustable.

3. The optical fiber manufacturing apparatus according to claim 2,
    wherein the gap between the inner sealing body and the outer sealing body is adjustable in a range of 0.01 mm to 1.0 mm.

4. The optical fiber manufacturing apparatus according to claim 1,
    wherein a ball transfer which is configured to hold the outer sealing body so as to be movable in the horizontal direction with respect to the inner sealing body is interposed between the inner sealing body and the outer sealing body.

5. The optical fiber manufacturing apparatus according to claim 1,
    wherein a gap between the inner sealing body and the outer sealing body is 0.01 mm to 1.0 mm.

6. The optical fiber manufacturing apparatus according to claim 1,
    wherein a gap between the outer peripheral surface of the outer sealing body and the inner peripheral surface of the shield pipe is 0.01 mm to 1.0 mm.

7. The optical fiber manufacturing apparatus according to claim 1, further comprising:
    a position detector that is disposed immediately below the drawing furnace and that detects a position of the bare optical fiber, which is pulled out downward from the drawing furnace, in the horizontal direction,
    wherein the alignment mechanism adjusts a position of the sending rod in the horizontal direction according to the position of the bare optical fiber detected by the position detector.

8. An optical fiber manufacturing method, comprising:
    providing the optical fiber providing apparatus of claim 1; and
    manufacturing an optical fiber using the optical fiber manufacturing apparatus according to claim 1, heating an optical fiber preform while adjusting gas pressure in a heating furnace at an upper end of the drawing furnace in a range of 5 Pa to 500 Pa.

9. An optical fiber manufacturing method, comprising:
    providing the optical fiber apparatus of claim 1; and
    manufacturing an optical fiber using the optical fiber manufacturing apparatus according to claim 1, setting the alignment mechanism such that an alignment possible range of the sending rod in the horizontal direction is larger than a maximum range of deflection of the sending rod in the horizontal direction.

* * * * *